United States Patent [19]

Rowland-Hill et al.

[11] 4,004,404
[45] Jan. 25, 1977

[54] ROTARY COMBINE WITH IMPROVED CONCAVE

[75] Inventors: Edward W. Rowland-Hill, Lancaster; Louis R. Thomas, Jr., New Holland, both of Pa.

[73] Assignee: Sperry Rand Corporation, New Holland, Pa.

[22] Filed: Mar. 1, 1976

[21] Appl. No.: 662,764

[52] U.S. Cl. .............................. 56/14.6; 130/27 K; 130/27 T
[51] Int. Cl.² ......................................... A01D 45/02
[58] Field of Search ................. 56/14.3, 14.4, 14.5, 56/14.6; 130/27 R, 27 H, 27 HF, 27 HA, 27 J, 27 JT, 27 K, 27 L, 27 P, 27 Q, 27 S, 27 T

[56] References Cited
UNITED STATES PATENTS

| | | | |
|---|---|---|---|
| 3,586,004 | 6/1971 | DePauw | 130/27 T |
| 3,669,122 | 6/1972 | Rowland-Hill | 130/27 T |
| 3,734,103 | 5/1973 | Mathews | 130/27 L |
| 3,742,686 | 7/1973 | Rowland-Hill | 130/27 T |
| 3,927,678 | 12/1975 | Rowland-Hill | 130/27 T |

Primary Examiner—Russell R. Kinsey
Attorney, Agent, or Firm—C. Hercus Just; Frank A. Seemar; John R. Flanagan

[57] ABSTRACT

A combine of the axial flow type having an axially extending power driven rotor which coacts with a concave complementary in shape to that of the rotor to thresh a wide variety of agricultural crop material. The concave comprises a plurality of longitudinal bars that are spaced transversely and a first row of curved wires extend through said bars adjacent the upper edges thereof and are spaced even distances in a longitudinal direction to form passages for threshed crop material. A second row of wires extend through a row of holes in said bars below said first row of wires. The second row of wires is spaced more closely than the wires of the first row to form pockets which receive said threshed crop material and remove the same from contact by said rotor to prevent damage to the threshed material and also provide more aggressive threshing of the material.

13 Claims, 8 Drawing Figures

ROTARY COMBINE WITH IMPROVED CONCAVE

CROSS REFERENCE TO RELATED APPLICATION

The present invention comprises a further improvement in concaves for axial flow type combines over the improvement comprising the subject matter of copending application Ser. No. 641,220, filed Dec. 16, 1975, and entitled "Axial Flow Combine Having Concave Relief," and commonly assigned.

BACKGROUND OF THE INVENTION

This invention relates to an axial flow type combine in which one or more rotors or coacting concaves are mounted longitudinally of the axis of the combine. Combines of this type are relatively expensive and especially in order to justify a substantial investment in a combine, it is desirable that the same be capable of harvesting a relatively wide variety of crop products. For example, the largest size of product normally harvested by a combine of this type is corn, whereby the kernels of corn are threshed or separated from the cobs, stalks, and leaves or blades, while the normally smallest size of product conventionally harvested by a combine of this type comprises alfalfa and clover, the seeds of which are very small. Concaves employed in so-called universal type combines of the kind referred to comprise a series of bars which extend longitudinally in the threshing compartment of the combine and a series of longitudinally spaced curved wires extend transversely through said bars to provide openings through which threshed material passes and is received by a grain pan beneath the concave, said pan discharging onto a suitable sieve unit incident to completing the separation of the product material from chaff and other waste material.

In view of the fact that rotors employed in this type of combine have rasp bars thereon which extend longitudinally of the rotors and coact with the bars of the concave to effect the disintegration of stalks and stems of the crop material in addition to threshing the seeds or kernels which are the desired crop material, it is essential that such rasp bars be of a very rugged nature and the bars of the concave similarly must be very rugged. Operating prime movers of high horsepower capacity, usually diesel engines, drive the rotors at relatively high speed in order to suitably handle substantial bulkage of the harvested crop material which is delivered to the threshing compartment by the header and elevator of the combine without choking or unduly impeding the speed of operation of the combine and especially the rotor in the threshing compartment. Further, in combines of this type, recent developments therein have included the employment of auger means on the forward end of the rotor to assist in feeding the cut crop material to the threshing compartment and the engagement of such auger means with the crop material produces at least a limited amount of threshing of the desired grain or kernels. Such threshed material from this source as well as that produced by engagement of the rotor and rasp bars with the concave has been found to be subject to damage when threshed kernels or grain are contacted by the rasp bars and this is undesirable.

For readily understanding the type of combine to which the present invention pertains, attention is directed to U.S. Pat. No. 3,696,815, dated Oct. 10, 1972, in the name of Edward W. Rowland-Hill, in which a coacting rotor and concave are illustrated in a multiple-type rotor combine, the concaves having a certain arrangement of wires extending between the bars thereof. Also, U.S. Pat. No. 3,734,103, dated May 22, 1973, in the name of Bernard C. Mathews, shows a rotor and concave in which the concave is provided with bars of a plurality of different sizes and the rotor extends transversely to the longitudinal axis of the combine, the axis of the concave also similarly extending transversely to said combine axis. This structure represents a somewhat earlier standard type of combine rather widely used prior to the advent of the axial flow type combine to which the present invention pertains.

U.S. Pat. No. 3,742,686, dated July 3, 1973, also in the name of Edward W. Rowland-Hill, illustrates a twin type rotor and concave combine which are of the axial flow type, said patent further illustrating upper concaved walls for the twin threshing compartments which include diagonally extending ribs that assist in moving the crop material longitudinally within the threshing compartment to effect more efficient threshing than if such longitudinal movement was not effected.

It will be seen that in the combines of the type illustrated in the aforementioned prior patents, only a single row of wires are employed in the concaves and the arrangement of wires used therein necessarily must serve to accommodate the entire range of sizes of crop materials which are to be threshed by said combines. Under such circumstances, there is no special attempt made to discharge the initially threshed material, either effected by the augers or otherwise, so as to remove the same from damaging engagement by the threshing apparatus and this it has been found that combines of this type are susceptible to effecting damage of at least some of the threshing crop material.

There also are combines of the earlier standard type referred to above which employ a rotor and concave which extend transversely to the longitudinal axis of the combine and in which a row of upper wires are included in the concave and, in addition, a second row of wires of the same diameter as the upper wires are arranged in a row below the upper row but no movement of the material being threshed in a direction parallel to the axis of the rotor and concave is possible, the lower row of wires being provided solely for attempting to adapt the concave to the threshing of different crops under various crop conditions.

SUMMARY OF THE INVENTION

It is the principal object of the present invention to provide in a combine of the axial flow type, which employs either single or multiple rotor and concave units, improved concave construction which provides an arrangement of concave wires forming a plurality of pockets extending from the leading end of the rotor and concave a predetermined distance toward the opposite end of the rotor, said pockets effectively and efficiently receiving products which are threshed near the inlet end of the threshing compartment as well as those occurring farther along in the threshing compartment and thereby remove the threshed or partially threshed material from active contact by the rasp bars of the rotor in order to minimize the possibility of the threshed material being damaged but nevertheless permitting additional threshing of the same, where necessary, due to the combine also having means to induce movement of the material in a direction longitudinally of the concave, the threshed material ultimately being discharged, via openings between the wires, to the grain pan of the combine.

It is another object of the invention to mount a lower row of wires in the concave selectively within a row of holes which are spaced substantially closer together in a longitudinal direction of the bars of the concave than an upper row of wires, whereby the spacing between the wires of the upper row are adequate to effectively permit passage of the larger size of crop material, such as corn, capable of being harvested by the combine and under such circumstances it is not necessary to employ the wires in the lower row under all conditions of use.

It is a further object of the invention to mount a lower row of wires in the concave selectively within a row of holes which are spaced substantially closer together in a longitudinal direction of the bars of a concave than an upper row of relatively course wires, said holes of the lower row being of uniform diameter which is substantially less than the diameter of the wires of the upper row, whereby the relatively larger diameter of the wires in the upper row provides desirable structural support for the concave structure and the relatively smaller diameter of the lower wires, made possible by virtue of the structural support of the upper wires, provides for more open space through which grain may be discharged.

It is still a further object of the invention to provide a plurality of sets of wires for the lower rows of holes, said sets respectively being of different diameters which are capable of being received by the holes of said second row, the sets of wires, of smaller diameter when mounted in the second row of holes providing discharge spaces therethrough which are wider then those provided when the wires of larger diameter are mounted in said holes, said spacing, however, being substantially less than the spacing between the wires of the upper set and thereby providing discharge spaces for crop products of intermediate size such as grains of wheat, rye, barley and the like, whereas when the wires of largest size for said second set are mounted in the holes, spaces of less width are provided than those afforded by the wires of smaller size, such spaces of less width being employed during the harvesting and threshing of seed products of the smallest size such as alfalfa and clover.

Still another object of the invention is to provide a sufficiently close spacing of the holes in the concave rods for said second row of wires that at least two wires in said second row will be disposed below and between each successive pair of coarser wires in the upper set thereof, thereby defining an effective pocket between successive bars and successive wires in the upper row into which threshed and semi-threshed crop material may immediately be received from the auger and rotor means of the threshing compartment, thereby minimizing the possibility of damage occurring to such threshed and semi-threshed material, while the upper portion of each threshing compartment is provided with diagonally extending ribs fixed to the inner surface of the concave cover of each compartment which includes longitudinal movement of the material being threshed in the threshing compartment between the concave and the rotor and its rasp bars, whereby any partially threshed material received in the aforementioned pockets is completely threshed by engagement thereof with the wires of the concave, including both the upper and lower wires thereof.

Ancillary to the foregoing object, it is a further object to dispose the upper row of wires a limited distance below the upper edges of the bars of the concave in order that shallow, longitudinally extending channels are provided in said concave between adjacent bars and defined by the upper surfaces of said upper row of coarse wires for purposes of facilitating the longitudinal movement of material being threshed and effect more aggressive threshing than has been possible with previous types of combines.

Details of the foregoing objects and of the invention, as well as other objects thereof, are set forth in the following specification and illustrated in the accompanying drawings comprising a part thereof.

DETAILED DESCRIPTION

Essentially, the principal object of the present invention is to provide threshing means in a combine of the axial flow type in which kernels, grains and seeds which are to be threshed from crop products handled by the combine are hit or otherwise engaged by the movable elements, such as the auger and rasp bars of the threshing compartment, to effect such threshing and thereafter instantly drop into pockets formed in the concave of the combine between the longitudinally extending bars and the transversely extending wires which are positioned in holes formed in said bars. A certain amount of additional threshing is also effected by engagement of any partially threshed products with said wires especially as the products are moved longitudinally along shallow channels provided in the upper portions of said concave between the bars thereof. The pockets referred to are formed by a first row of wires which are mounted adjacent but spaced a limited distance below the upper edges of said bars, and a selectible set of wires from a plurality of sets thereof, respectively, of the same or different diameters, which are inserted through a second, lower row of holes below the said first row of wires for purposes of forming so-called "bottoms" for said pockets, the length of which are defined in an axial direction by the first set of wires. In the preferred embodiment, the first row of wires is relatively course with respect to the selectible set of wires. The large upper wires provide necessary structural support and thereby permit use of thinner wires or no wires in the lower rows to enhance discharge via the resulting increased space available. These pockets, in effect, provide an immediate escape for threshed and semi-threshed kernels, grains and seeds from engagement by the movable threshing element such as one or more augers or rotors in the threshing compartment or compartments, depending upon whether a single threshing unit or a pair of side-by-side threshing units are provided in the combine. By permitting such immediate entrapment via said pockets, damage to the threshed and semi-threshed products which would otherwise result from further engagement by the movable elements of the threshing means, is greatly minimized and to a large extent is prevented. Details of the structure by which this is accomplished are set forth below in conjunction with the drawings accompanying the application.

Figure 1:
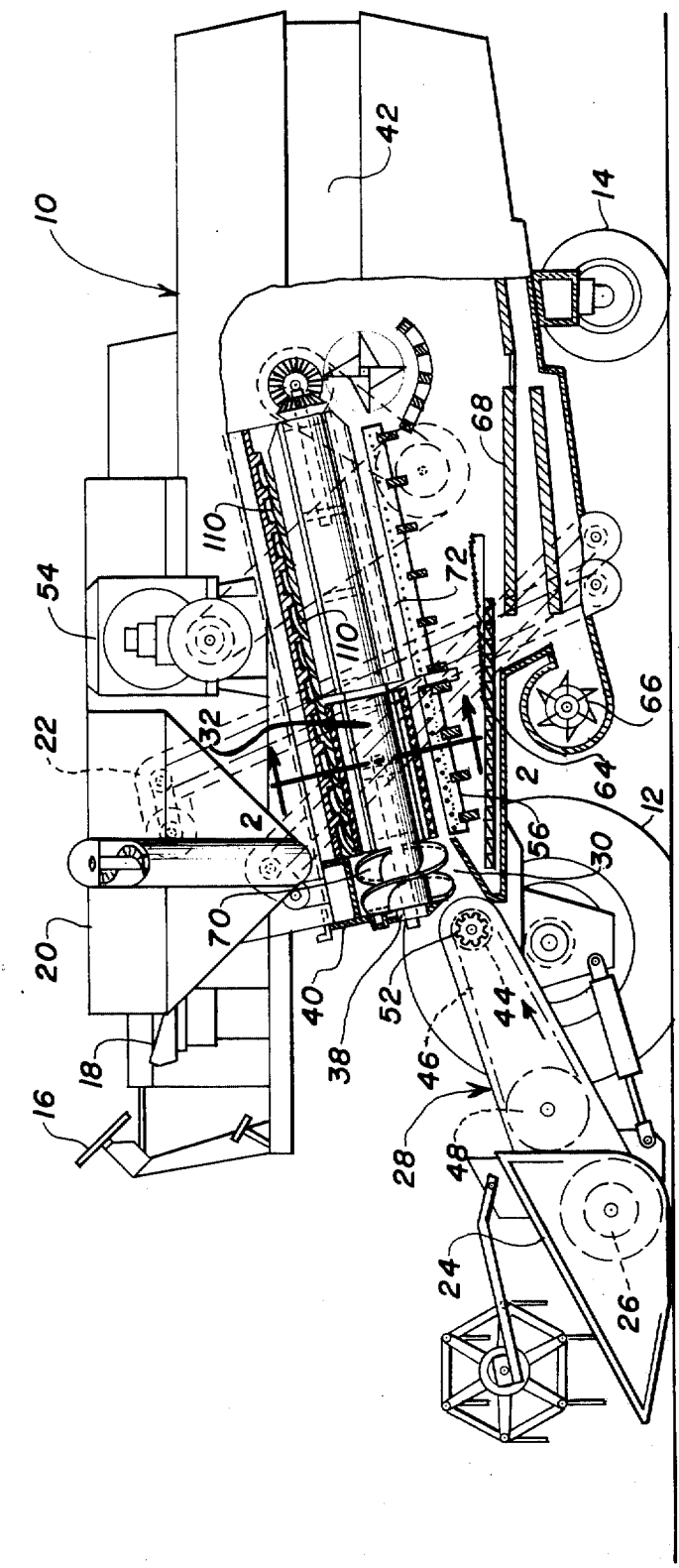
FIG. 1 is a side elevation of an exemplary axial flow type combine partly broken away and illustrated in vertical section to show details of the improvement afforded by the present invention.

Referring to FIG. 1, the exemplary illustration of an axial flow type combine illustrated therein comprises an enclosing housing 10 which is mounted upon a main frame that is supported by a pair of forward, large traction wheels 12 which are spaced transversely apart, and a pair of smaller, steering wheels 14 which are positioned under the rearward portion of the housing 10 and are operated in steering manner by a forward steering wheel 16 and positioned to be operated by an operator seated upon the seat 18 at an elevated position above the forward portion of the combine. As illustrated, said combine also includes in said figure a grain bin 20 which receives grain from an elevator 22 which is shown in phantom in said figure.

Mounted forwardly of the combine is a typical header 24 which includes both cutter means and a consolidating auger 26 that delivers cut crop material to an elevator 28 which is positioned between the traction wheels 12. Said elevator is composed of conventional means comprising flexible belts which extend around drums or wheels and the transverse bars extend therebetween. Said belts move in the direction of the arrows, shown in FIG. 1. It will be seen from this that the feeding of cut crop material occurs in an undershot manner onto a feed ramp at the underside of the auger compartment 30.

Figure 2:
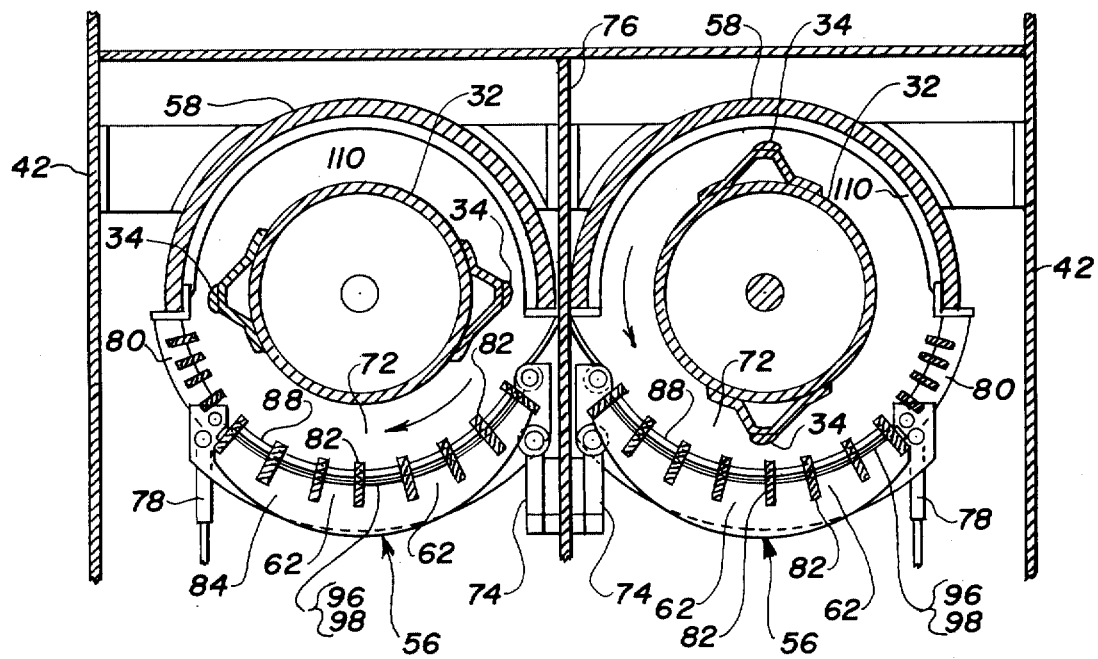
FIG. 2 is a fragmentary vertical sectional view of the improved portion of the combine as seen on the line 2—2 pf FIG. 1, the scale employed in FIG. 2 being substantially larger than that used in FIG. 1.
Figure 3:
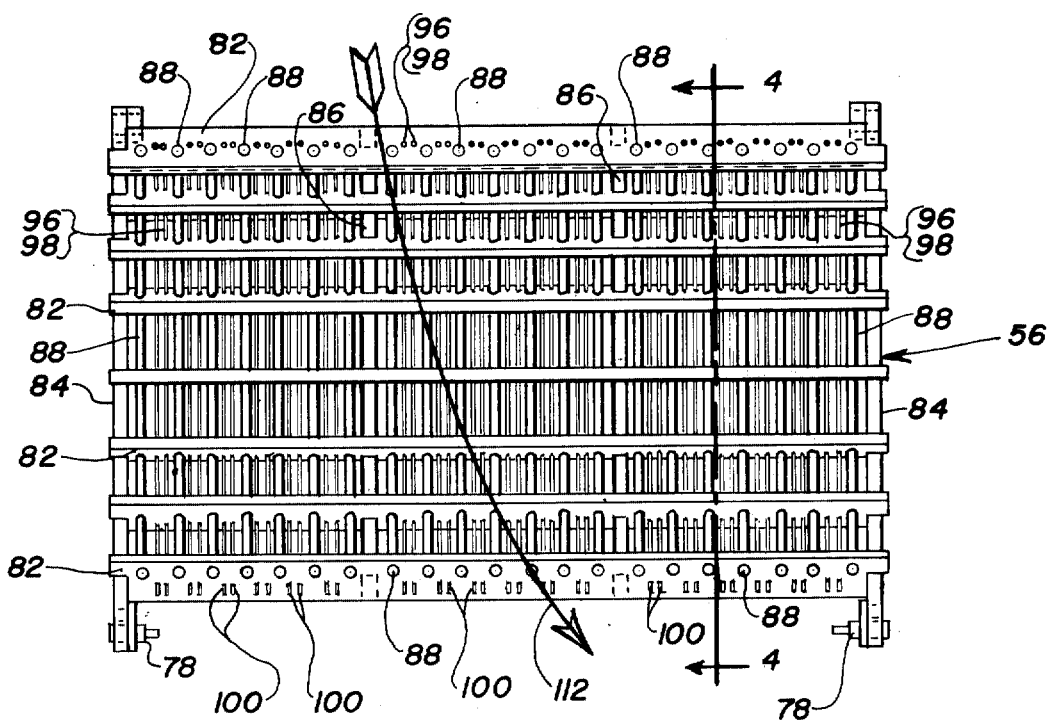
FIG. 3 is a top plan view of the concaves illustrated in FIG. 2 and shown on a larger scale than used in FIG. 2, said view illustrating in overall manner the wire arrangement of the concaves comprising the improvement afforded by the present invention.

The crop material is threshed by the rotors 32, details of which are best shown in FIGS. 2 and 3, said rotors comprising a plurality of rasp bars 34 which extend longitudinally thereof and are supported suitably upon the outer surfaces of the generally tubular rotors 32. The forward ends of the rotors 32 have a shaft 36 extending inwardly into the forward ends of said rotors a predetermined distance and the same project forwardly through suitable bearings 38 mounted in the front plate 40 which extends transversely between opposite sides of the main frame 42, shown fragmentarily in FIGS. 1 and 2.

The elevator 28 is shown diagrammatically in FIG. 1 and it will be seen that it comprises an uppermost drive cylinder 44 around which a plurality of endless chains or belts 46 extend for driving engagement of the same in the direction of the arrows shown in FIG. 1, said chains also extending around a forward supporting cylinder 48, shown in phantom in FIG. 1. The belts or chains 46 support therebetween a plurality of cross bars of conventional type. The drive cylinder 44 for the elevator is actuated by a sprocket gear 52 which is connected by a sprocket chain, not shown, extending to and actuated by the main drive mechanism of the combine which comprises a diesel engine 54 of substantial power.

In the specifically illustrated combine shown in the present drawings, the rotors 32 and rasp bars 34 thereon respectively rotate in opposite rotary directions as indicated by the direction arrows shown in FIG. 2. In particular, the rasp bars coact with concaves 56 which preferably are mounted in the lower portion of the elongated threshing compartments respectively defined by elongated upper shields 58, shown in FIG. 2, and the concaves 56 which are curved and comprise the lower portions of said compartments. It also will be seen that said concaves extend circumferentially around the orbital paths of the rasp bars 34 for at least one quarter of the circumference of said path, as can be visualized frm FIG. 3. Said concaves have openings therethrough which are formed by means described in detail hereinafter, for purposes of permitting the shelled or threshed crop material to pass therethrough, together with a certain amount of chaff and waste material. Said shelled or threshed material is received upon a grain pan 64, shown in FIG. 1, which is operated in conventional manner by driving mechanism, not shown, for purposes of permitting the grain or other crop material to be sifted therethrough for engagement by the lower end of the crop elevator 22. Chaff is blown by blower 66 toward the rear of the combine for discharge therefrom after being engaged by the chaffer sieves 68 which are shown in FIG. 1.

The rotors 32 also support at the forward ends thereof augers 70 which, as can be seen from FIG. 1, are for purposes of permitting more efficient feeding of crop material which is delivered in an undershot manner by the upper end of the elevator 28 to the threshing compartment 72 which extends between the rotors 32 and the concave 56 but, more accurately, it may be said that said compartment extends between the inner surface of the concaves 56 and the orbital paths of the rasp bars 34, the radial dimension of the latter compartment being relatively small and, for purposes of the present invention, being designated a threshing region which extends for the full length of the rasp bars 34 as viewed in FIGS. 1 and 2. The crop material to be shelled or threshed is delivered by the auger 70 which moves the material up the lower inclined plate 74 to the inlet end of the threshing compartment or region 72.

It is to be understood that the present invention is applicable to a combine in which only a single threshing compartment is embodied, notwithstanding the fact that a pair of such compartments, including rotors and concaves, are illustrated in the present drawings. This is because the present invention primarily is concerned with the construction of the concave 56 in one or both of the threshing compartments, depending upon the number which are embodied in the combine.

Referring to FIG. 2, it will be seen that the concaves 56 shown therein are supported at the inner edges thereof by bracket members 74 which respectively are on opposite sides of a vertical dividing plate 76 which separates the two threshing compartments from each other. The outer edges of the concaves 56 respectively are supported by toggle members 78 which are vertically adjustable, by means not shown in the drawings since the specific support of the concaves does not necessarily comprise a critical part of the present invention. Also, between the outer edges of each of the concaves 56 and the upper shields 58, auxiliary concaves sections 80, which are of less width than the concaves 56, are mounted for purposes of supplementing the threshing action of the main concaves 56.

As referred to hereinabove in the introductory portion of the specification, the present invention primarily is concerned with providing means in the concave which renders the combine capable of more efficiently threshing over a relatively wide range of different sizes of crop material than has been possible with concaves of the type previously provided in axial flow type combines heretofore available. These sizes of crop materials extend from corn kernels which are substantially of the largest size intended to be handled by a combine of this type, to medium size grains such as wheat, rye, barley and oats, down to and including the relatively finest sizes of seed such as alfalfa and clover which are very small in size compared to the intermediate and largest sizes of crop products described. To achieve this, the concave comprising the present invention includes structural details specifically described below which not only facilitate the more efficient handling of such a wide range of sizes of different crop products but, in addition, minimizes the possibility of damage to such threshed product after the same have initially been engaged by the movable elements in the threshing compartment such as the auger 70 and rasp bars 32, and thereby not subject the threshed or partially threshed crop products to any subsequent engagement by such movable threshing components.

Figure 4:
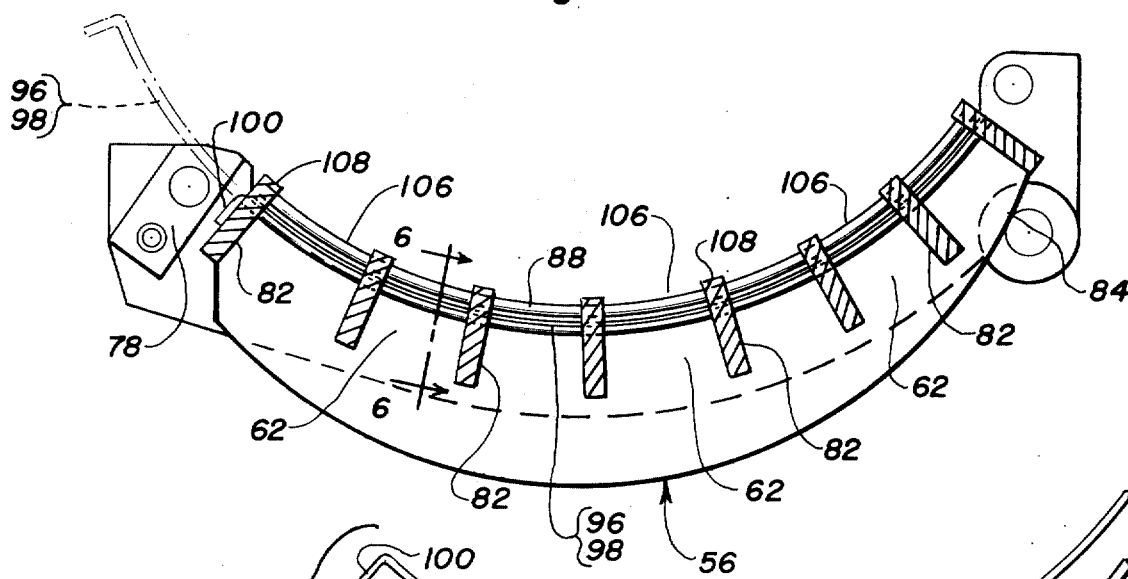
FIG. 4 is an enlarged transverse sectional view of the concave shown in FIG. 3 as seen on the line 4—4 of said figure, one of the wires of the concave being illustrated in phantom in partially removed position in this figure.
Figure 5:
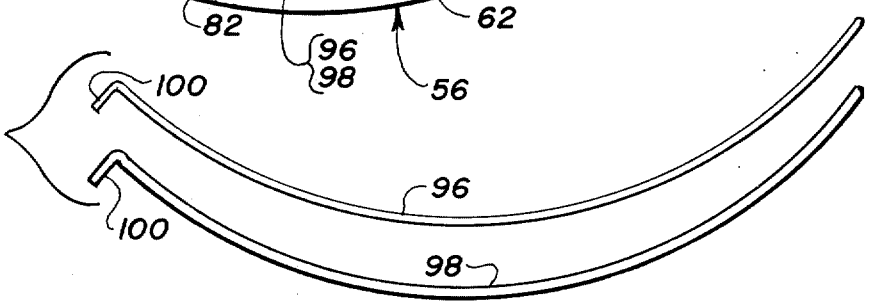
FIG. 5 illustrates in side elevation two different sizes of auxiliary wires intended for use in the concave illustrated in the preceding figures.
Figure 6:
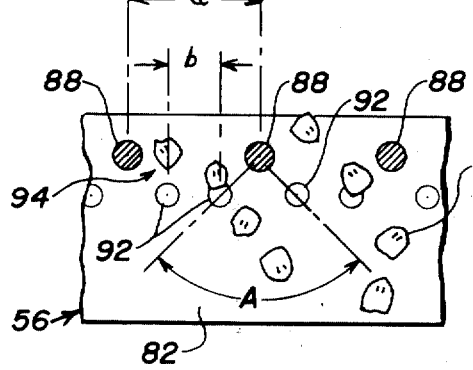
FIG. 6 is a fragmentary longitudinal sectional view of the concave shown in FIG. 4 as seen on the line 6—6 thereof, this figure illustrating only the larger diameter wires and also showing a row of empty holes, said arrangement being adapted to provide spaces readily to pass large crop products therethrough which have been threshed.
Figure 7:
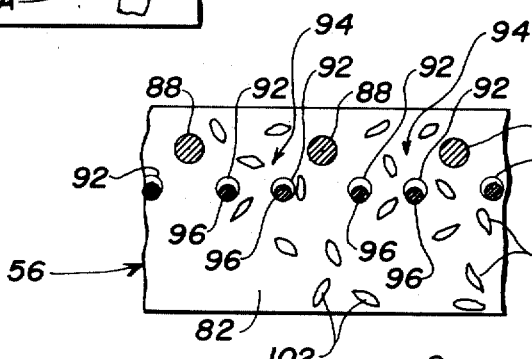
FIG. 7 is a fragmentary vertical sectional view similar to FIG. 6 but showing in addition to the larger diameter upper wires a series of smallest diameter auxiliary wires, such as shown in the upper portion of FIG. 5, which are inserted in the row of holes below the upper row of larger diameter wires for purposes of providing spaces of restricted width between successive wires in said lower row to enable medium size threshed crop products to pass therethrough.
Figure 8:
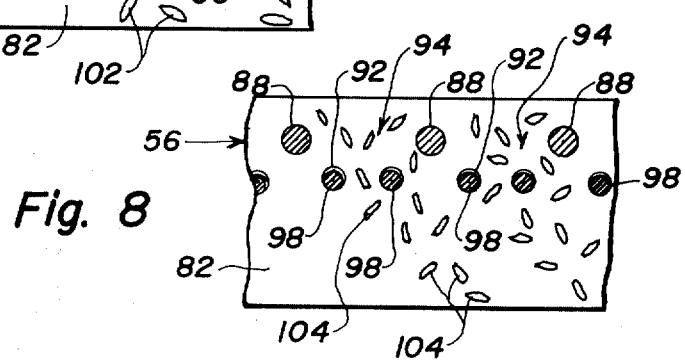
FIG. 8 is another fragmentary vertical sectional view similar to FIGS. 6 and 7 but showing inserted in the lower row of holes shown therein the larger sizes of auxiliary wires illustrated in the lower portion of FIG. 5 for purposes of providing therebetween spaces of the smallest size for purposes of effecting passage therethrough of the smallest sizes of seed and grain products intended to be threshed by the combine comprising the present invention.

The improved detailed concave structure comprising the invention is best illustrated in FIGS. 2–5 and the operation and function thereof is clearly shown in FIGS. 6–8, to which attention is directed. The concave 56, as illustrated in FIGS. 2–4, comprises a plurality of similar elongated, flat bars 82 which extend substantially radially with respect to the central axis of the rotors 32 as seen in FIG. 2. The outer ends of the bars 82 are fixedly connected to arcuate transversely extending support plates 84 and a plurality of similar intermediate arcuate support plates 86 also supplement the supporting action of the support plates 84. As viewed in FIG. 3, the inner edge of the concave 56 with respect to its position shown in FIG. 2 is shown at the bottom of FIG. 3.

It is the purpose of the present invention to provide a plurality of pockets in the upper portions of the concave 56, the formation of which is as follows. As can be seen from FIGS. 2, 4 and 6–8, there extends through the upper portions of bars 82, but spaced a limited distance from the upper edges thereof, a first row of curved wires 88 which are spaced longitudinally along the bars 82 even distances designated $a$ in FIG. 6 between the centerlines of two successive wires 88. Without specific restriction thereto, but for purposes of affording an appreciation of practical dimensions, one suitable diameter for the wires 88 is 0.220 inch and the distance $a$ is approximately 1.25 inches. It has been found that this distance between the wires 88 of the first, upper row thereof, is adequate to readily pass therebetween threshed or partially threshed crop products, such as kernels of corn, which represents the largest size of products for which the combine is adapted to harvest, said kernels of corn being illustrated in FIG. 6 by the numerical 90.

The concave also is provided in the bars 82 with a second row of holes 92 which are approximately 0.188 inch in diameter in the preferred construction. From FIGS. 6–8, it will be seen that the distance $b$ between the centerlines of holes 92, as shown in FIG. 6, is approximately one-third of dimension $a$, such as of the order of approximately 0.40 inch or possibly a few extra thousandths of an inch. Likewise, it will be seen that the holes 92 are arranged preferably along a straight longitudinal line below the row wires 88 and, preferably, at least a pair of the holes 92 are disposed between centerlines of each pair of successive wires 88 for purposes of forming pockets 94, the sides of which are defined by the adjacent bars 82 and the successive wires 88, together with other wires, described below, which are interchangably mounted within the holes 92 and thereby comprise the bottom of such pockets.

It should be emphasized that the relative number and size of wires and holes as well as various spacing dimensions set forth herein are merely for the purpose of illustrating a particular successful arrangement and it is not intended that the invention be limited in scope by virtue of such practical dimensions and configurations. For example, although the pockets in the illustration are formed by two lower wires having diameters relatively less than the wires in the first row, the invention contemplates arrangements whereby the diameters of the wires in the second set are not less than the first set and the number of wires in the second set is greater than or less than the number of wires in the first set depending on size and condition of crop products being harvested.

When the combine is arranged to harvest and thresh the larger sizes of crop products such as corn, the aforementioned smaller diameter wires, which can be replaced interchangably within the holes 92, are omitted from the combine and the spaces $a$ between the individual larger diameter wires 88 are adequate to readily pass therebetween shelled or threshed and partially threshed product kernels after the same have been engaged either by the auger 80 or the rasp bars 34 and thereby minimize if not completely eliminate the danger of such kernels being again contacted by the moving threshing elements and thereby damage by the same. The function of the holes 92 is to receive a set of a second row of curved wires which supplement the function of the first row of wires 88, said set of wires being selectible from at least at pair of sets respectively of different diameters such as shown in exemplary manner in FIGS. 5, 7 and 8. Referring to FIG. 5, the smaller diameter wires 96 of said second set are shown in FIG. 5, while the wires 98 are of larger diameter than the wires 96. If found to be necessary, perhaps an even further set of wires of a different diameter may be employed as long as the same can be received within the holes 92. By way of example, it has been found that a practical dimension for the wires 96 is 0.141 inch and an exemplary diameter for the wires 98 is 0.180 inch. These diameters of wires readily will be received within the aforementioned dimension of the holes 92.

The wires 96 and 98 are substantially of the same curvature and each of the wires has an angularly bent end 100 thereon to facilitate the insertion and removal of the wires relative to the holes 92, as well as limit the insertion of the wires therein. Preferably, the first row of the upper wires 88 are mounted within appropriate holes formed in the bars 82 and are sufficiently rugged to protect the smaller wires from damage by crop bulkage, rocks and the like.

It also has been found from experimentation that each pair of the holes 92 of the second row thereof for the smaller diameter supplemental wires 96 and 98 preferably are evenly spaced between successive wires 88 of the first row thereof as can be readily seen from FIGS. 6, 7 and 8. Further, by way of preferred positioning of these holes, referring to FIG. 6, it will be seen that lines drawn from each upper wire 88 downwardly through the centerlines of the closest holes of each pair of holes 92 will describe and arc A of approximately 90°. Further, the purpose of such arrangement of the second row of holes 92 with respect to the upper row of wires 88 and the relative spacing between the holes 92 as well as the wires 88 is for purposes of forming the aforementioned pockets 94 and condition the same for greatest efficient operation with respect to grains, seeds and the like of sizes less than the largest size of threshed crop material such as corn kernels 90. Accordingly, when threshing grain of intermediate size such as wheat, rye, barley and oats, the set of similar diameter arcuate wires 96 are disposed within the holes 92 as shown in FIG. 7 for purposes of providing spaces of intermediate size between not only each pair of wires 96 but also between the wires 96 and wires 88 to permit the passage of medium size grains, which are illustrated in exemplary manner in FIG. 7 and designated by the numerical 102. Therefore, the arrangement of wires shown in FIG. 7 provides adequate pockets 94 within which the threshed and possibly partially threshed grain products can enter and thus be free of danger from any further contact by the rotating threshing elements such as the auger 70 and rasp bars 34.

Referring to FIG. 8, the larger diameter wires 98 of the second set thereof are disposed within the holes 92 for purposes of providing smaller spaces respectively between pairs of the wires 98 and between the wires 88 and 98, for purposes of passing therebetween the smallest size seeds, for example, such as alfalfa and clover, which are capable of being harvested by the combine.

The concave structure also is provided with shallow, flat, longitudinally extending channels 106, the bottoms of which are defined by the upper row of relatively coarse wires 88 and the upper portions are defined by the upper edges 108 of the bars 82. This can be best appreciated from FIG. 4. Arcuate spiral rib segments 110 which are shown fragmentarily in FIG. 1 and are also shown in end view in FIG. 2. These ribs preferably extend around the inner surface of the upper shields 58 for substantially the full circumference thereof and the function thereof is to produce longitudinal movement of the bulk of the material being threshed within the substantially cylindrical threshing compartment 72 between the rotors 32 and and concaves 56 and upper shields 58. Such longitudinal feed is gradual and progressive and the movement is somewhat diagrammatically illustrated by the direction arrow 112 shown in FIG. 3. In view of this, crop material which is only partially threshed and is received within the pockets 94 for example, can be carried along the concaves longitudinally due to the upper edges 108 of the bars 82 preventing any appreciable rotary movement thereof, whereby such partially threshed material is forced to engage the upper wires 88 and/or the second, lower row of wires 96 or 98, depending upon the type of material being threshed, and thereby achieve final threshing thereof prior to the same falling onto the grain pan 64 and ultimately being sifted by the sieve unit 68. Meanwhile, the threshed and semi-threshed material is not subjected to further contact by the movable elements in the threshing compartment as explained above.

In view of the foregoing, it will be seen that the present invention provides a structurally sound concave having a wide range of adaptability to effectively thresh a relatively wide range of different sizes of crop material from the substantially larger sizes such as kernels of corn, to the smallest sizes of seeds, such as alfalfa and clover seeds, by the arrangement of a first row of upper wires 88 and the selective positioning of a second set of wires chosen from several sets respectively of the same or different diameters for purposes of forming in conjunction with the first row of larger wires 88 a series of pockets 94 and spaces between the selected sets of wires disposed in the lower, second row of holes 98 and the wires 88 for purposes of instantly receiving fully threshed product material from the threshing compartment and also semi-threshed material which is subjected to final threshing by engagement with said wires in the manner described above prior to the threshed material passing to the grain pan 64, the primary purpose of this being to minimize the occurrence of damage to the threshed material and thus enhance the value of the crop. Mounting of the supplemental second row of wires 96 or 98 within the holes 92 is accomplished readily by removing the auxiliary concave sections 80 to permit access to the bent ends 100 of the wires 96 and 98 either for purposes of inserting or removing the same from the holes 92.

While the invention has been described and illustrated in its several preferred embodiments, it should be understood that the invention is not to be limited to the precise details herein illustrated and described since the same may be carried out in other ways falling within the scope of the invention as illustrated and described.

Having thus described the invention, what is claimed is:

1. An axial flow type rotary combine comprising in combination:
   a. a mobile frame adapted to be moved along a crop field to be harvested,
   b. a header supported by the forward end of said frame and operable to cut crop material, c. an elevator rearward of said header to receive cut crop material from said header and move it rearwardly to d. a threshing compartment having a forward end and extending longitudinally rearwardly within said frame, e. said threshing compartment comprising a powered rotor having rasp bars extending generally longitudinally for coaction with a concave complementary to said rotor in shape and extending generally along the lower peripheral path of the rasp bars to thresh crop material therebetween, and f. a grain pan at a level beneath said threshing compartment to receive threshed crop material therefrom;

the improvement comprising an improved concave in which;

g. a plurality of longitudinally extending bars extend between curved end plates in transversely spaced relationship to each other, h. a first row of curved wires extending transversely through said bars adjacent the upper edges thereof and spaced apart predetermined distances to provide a mesh pattern of openings with said bars through which threshed crop material freely passes, i. a second row of similarly curved wires supported within holes in said bars, whereby the second row of wires are spaced to provide a greater frequency of said wires than in said first row and thereby pockets are provided between and below the wires of said first row to entrap threshed crop material and prevent damage to said material by said rotor prior to said material passing between said second row of wires and onto the grain pan of said combine.

2. The combine according to claim 1 in which the spacing of said second row of wires is such as to dispose a pair of said wires between and below each pair of wires of said first row.

3. The combine according to claim 2 in which the angle between the center line of each of said larger wires and the center line of each of the smaller wires nearest the same is substantially 90°.

4. The combine according to claim 1 in which the upper portion of said threshing compartment further is provided with arcuate spiral rib segments spaced apart longitudinally and similarly sloping in the direction of rotation of said rotor from the forward toward the rearward discharge end of the compartment, whereby the threshed material received within said pockets between said first and second rows of wires also is moved axially along said concave, thereby enhancing the threshing action upon the material without permitting any appreciable injury thereto from contact by the rasp bars of said rotor.

5. The combine according to claim 4 in which said first row of wires are spaced below the upper edges of the concave bars a short distance and thereby provide shallow longitudinal channels extending axially within said threshing compartment to minimize rotary movement of said material between said concave and rotor while being threshed and while being moved along said channels by the action of said spiral rib segments and thereby enhance the threshing action of said wires upon said crop material.

6. The combine according to claim 1 in which the spacing between the wires of said first row is adequate to permit passage of the largest size of crop product to be harvested by said combine and the spaces between the wires of the second row is substantially less than the half the distances between the wires of the first row to permit the passage of smaller crop material therethrough for discharge from said pockets.

7. The combine according to claim 6 in which the wires of said second row are readily removable under conditions when the combine is harvesting crop of material of said largest size.

8. The combine according to claim 7 in which a plurality of sets of wires respectively of different diameter less than the wires of said first row for positioning selectively within said row of smaller diameter holes to provide spaces therebetween of different widths respectively adapted to pass threshed crop material of different sizes to maximum efficiency, the set of said wires of larger diameter being utilized for harvesting crop material of smallest size capable of being harvested by said combine.

9. The combine according to claim 8 in which the diameter of the larger wires of said plurality of sets of wires for said holes of smaller diameter are approximately two-thirds the diameter of said first row of wires and the diameter of the smaller wires of said plurality of sets thereof is approximately two-thirds the diameter of the larger wires of said sets thereof.

10. The combine according to claim 6 in which the centerlines of said holes for said second row of wires is approximately one-third the distance between the holes for said first row of wires and successive pairs of said holes for said second row of wires are positioned substantially equidistant between the centerlines of successive holes for said first ror of wires in a direction longitudinally of said concave.

11. The combine according to claim 1 in which the first row of curved wires is of relatively larger diameter than said second row of similarly curved wires.

12. The combine according to claim 11 in which is provided a similar row of holes of smaller diameter than said larger diameter wires extending through said bars generally along a line spaced below said row of larger diameter wires and spaced apart substantially shorter distances longitudinally of said bars than said larger diameter wires.

13. The combine according to claim 12, wherein said first row of curved wires of relatively larger diameter are spaced apart substantially uniform predetermined distances adjacent the upper edges of said bars.

* * * * *